(12) United States Patent
Krämer et al.

(10) Patent No.: US 12,072,058 B2
(45) Date of Patent: Aug. 27, 2024

(54) CLAMP ASSEMBLY WITH A HEAT PROTECTION DEVICE

(71) Applicant: NORMA Germany GmbH, Maintal (DE)

(72) Inventors: Markus Krämer, Maintal (DE); Helmut Geppert, Maintal (DE); Natan Lantsmann, Maintal (DE)

(73) Assignee: Norma Germany GmbH, Maintal (DE)

( * ) Notice: Subject to any disclaimer, the term of this patent is extended or adjusted under 35 U.S.C. 154(b) by 0 days.

(21) Appl. No.: 17/633,698

(22) PCT Filed: Aug. 3, 2020

(86) PCT No.: PCT/EP2020/071795
§ 371 (c)(1),
(2) Date: Feb. 8, 2022

(87) PCT Pub. No.: WO2021/023704
PCT Pub. Date: Feb. 11, 2021

(65) Prior Publication Data
US 2022/0316647 A1    Oct. 6, 2022

(30) Foreign Application Priority Data
Aug. 8, 2019    (DE) .................... 10 2019 121 432.7

(51) Int. Cl.
*F16L 33/08*    (2006.01)
*F16L 3/123*    (2006.01)
*F16L 59/18*    (2006.01)

(52) U.S. Cl.
CPC ........... *F16L 59/187* (2013.01); *F16L 3/1233* (2013.01); *F16L 33/08* (2013.01)

(58) Field of Classification Search
CPC ....... F16L 59/187; F16L 3/1233; F16L 33/08; F16L 3/12
See application file for complete search history.

(56) References Cited

U.S. PATENT DOCUMENTS 2,352,823 A * 7/1944 Ellinwood ............ F16L 3/1233
                                                     174/40 CC
2,373,300 A * 4/1945 Ellinwood ............ F16L 3/1233
                                                     269/130

(Continued)

FOREIGN PATENT DOCUMENTS

CN    104455941 A    3/2015
DE       925743 C    3/1955

(Continued)

OTHER PUBLICATIONS

German Office Action for German Application No. 10 2019 121 432.7 dated Jun. 12, 2020 (4 pages).
International Search Report for International Application No. PCT/EP2020/071795 dated Oct. 22, 2020 (3 pages).
English Translation of International Search Report for International Application No. PCT/EP2020/071795 dated Oct. 22, 2020 (2 pages).
Chinese Office Action for Chinese Application No. 202080050251.4 dated Jan. 20, 2023 (7 pages).

(Continued)

*Primary Examiner* — Zachary T Dragicevich
*Assistant Examiner* — James A Linford
(74) *Attorney, Agent, or Firm* — REISING ETHINGTON, P.C.

(57) ABSTRACT

A clamp assembly has a clamp with a clamp band and a clamping device for clamping the clamping band and has a heat protection device with a housing and at least one insulating layer. The housing has a respective wall at each axial end face, the wall being divided into sections and protruding radially inwards, and the at least one insulating layer can be positioned between the walls of the housing. The clamp can be surrounded at least in some regions by the housing and/or the at least one insulating layer of the heat protection device, and the heat protection device is designed to be connectable to the clamp.

10 Claims, 7 Drawing Sheets

(56) References Cited

U.S. PATENT DOCUMENTS

| | | | | |
|---|---|---|---|---|
| 2,379,568 | A | * | 7/1945 | Ellinwood ............ F16L 3/1233 |
| | | | | 174/40 R |
| 2,466,921 | A | * | 4/1949 | Tinnerman ............ F16L 3/1233 |
| | | | | 24/23 EE |
| 3,015,465 | A | * | 1/1962 | Schmitt ................ F16L 3/1233 |
| | | | | D25/68 |
| 4,441,677 | A | * | 4/1984 | Byerly ................ F16L 3/1233 |
| | | | | 24/DIG. 22 |
| 6,457,748 | B1 | | 10/2002 | Webb et al. |
| 10,612,706 | B2 | | 4/2020 | Gugau et al. |
| 2017/0307117 | A1 | | 10/2017 | Gugau et al. |

FOREIGN PATENT DOCUMENTS

| | | |
|---|---|---|
| DE | 3926626 A1 | 10/1990 |
| DE | 202010014995 U1 | 1/2012 |
| DE | 202016002955 U1 | 6/2016 |
| EP | 0145020 A3 | 12/1986 |
| FR | 2881054 A1 | 7/2006 |
| RU | 2096676 C1 | 11/1997 |
| WO | WO0181814 A1 | 11/2001 |

OTHER PUBLICATIONS

English Translation of Chinese Office Action for Chinese Application No. 202080050251.4 dated Jan. 20, 2023 (4 pages).

Russian Office Action for Russian Application No. 2022104171/12(008815) dated Sep. 27, 2022 (7 pages).

English Translation of Russian Office Action for Russian Application No. 2022104171/12(008815) dated Sep. 27, 2022 (6 pages).

Russian Search Report for Russian Application No. 2022104171/12(008815) dated Sep. 27, 2022 (2 pages).

English Translation of Russian Search Report for Russian Application No. 2022104171/12(008815) dated Sep. 27, 2022 (2 pages).

Japanese Office Action for Japanese Application No. 2022-507855 dated Feb. 7, 2023 (8 pages).

English Translation of Japanese Office Action for Japanese Application No. 2022-507855 dated Feb. 7, 2023 (10 pages).

Korean Office Action for Korean Application No. 10-2022-7000978 dated Jun. 19, 2024 (8 pages).

English Translation of Korean Office Action for Korean Application No. 10-2022-7000978 dated Jun. 19, 2024 (6 pages).

* cited by examiner

CLAMP ASSEMBLY WITH A HEAT PROTECTION DEVICE

INTRODUCTION

The disclosure relates to a clamp assembly having a clamp having a clamping band and having a clamping device for clamping the clamping band, and having a heat protection device having a housing and having at least one insulation insert. Furthermore, the disclosure relates to a heat protection device for a clamp assembly.

In different technical fields, clamps are used to connect hoses or pipes. In particular, clamps can be used to lock hoses or pipes to corresponding supports and consequently to prevent a discharge of a fluid. Such a fluid may, for example, be a heating fluid or a coolant.

Particularly using metal clamps and connectors, a high quantity of heat of the fluid can be discharged to an environment or adjacent components. As a result of an uncontrolled heat loss, the efficiency of systems can be impaired.

Furthermore, as a result of a high fluid temperature, a clamp can also become powerfully heated and consequently represent a potential danger for adjacent components which are not heat-resistant.

Generally, the fitting of a heat shield to such clamps and connection locations is carried out after an assembly of the respective clamps. At connection locations between two pipes, a heat protection can be arranged in a straightforward manner. The arrangement of a heat protection on clamps may be problematic as a result of the varying shape.

SUMMARY

An object of the disclosure, per an embodiment, is therefore to provide a clamp assembly having a heat protection device which has a reduced assembly complexity.

The disclosure relates to a clamp assembly which has a clamp having a clamping band and having a clamping device for clamping the clamping band and a heat protection device.

The heat protection device has a housing and at least one insulation ply or an insulation layer. The housing has at the axial end faces thereof a wall which is subdivided into portions and which protrudes radially inward. In particular, the housing may at least be stamped in a partially annular manner and be substantially closed at an outer side. At an inner side, the housing may be configured in an open manner.

The at least one insulation insert or insulation layer can be positioned between the walls of the housing. The clamp is at least in regions engaged round by the housing and/or the at least one insulation layer of the heat protection device, wherein the heat protection device is configured so as to be able to be connected to the clamp.

The disclosure further relates to a heat protection device for surrounding a clamp at least in regions. The heat protection device has a housing which extends at the circumference and which has two walls which are formed so as to protrude in a radial direction. Furthermore, the heat protection device has at least one insulation layer which can be inserted into the housing, wherein the at least one insulation layer can be inserted directly or via at least one spacer element into the housing.

The housing of the heat protection device may be able to be formed from a sheet-like material, for example, by means of punching and bending. In particular, the housing may comprise a metal or a heat-resistant plastics material. The housing has a circumferential wall and two walls which protrude from the circumferential wall in a radial direction. In the assembled state of the heat protection device, the housing forms a U-shaped profile which is closed toward the outer side by the circumferential wall. At the open side of the housing, one or more insulation layers may be placed in the U-shaped profile or between the walls of the housing. As a result of the U-shaped profile, there is formed a receiving space of the housing which is delimited in regions by the walls and the circumferential wall.

The walls of the housing are subdivided into portions which can be spaced apart from each other by recesses. The recesses or the portions are in this instance formed in such a manner that the housing can be positioned at the circumference around a clamp. In particular, the portions may have a shape which tapers with increasing spacing from the circumferential wall, whereby the housing can conform to a substantially round clamp at the circumference.

The walls may have a length which enables one or more insulation layers and the clamp to be received. As a result of a sufficient length of the walls, a compression of the at least one insulation layer and consequently impairment of the insulation effect can be prevented. One or more portions of the wall may be configured to be longer in order to produce a connection to the clamp by means of the extended portions being bent at the end. The clamp may be able to be received as the last component or layer in the open profile of the housing and be able to be closed by the extended bendable flanks or portions in regions.

Alternatively, or additionally, the clamp may have an axial extent which substantially corresponds to an axial extent of the receiving space of the housing. The clamp can thereby be pressed as a closure of the receiving space into the housing or be connected by means of locking connections in a positive-locking manner to the housing of the heat protection device.

The insulation layer may, for example, comprise an intumescent material. Preferably, per an embodiment, the at least one insulation layer may act as a flame protection. To this end, the at least one insulation layer of the heat protection device may have the lowest possible thermal conductivity. The insulation layer may be configured as a mineral fiber mat or as a microporous material insulation. The at least one insulation layer may be connected to the housing in a positive-locking or materially engaging manner so that the heat protection device can be handled as an almost integral component in the assembly of the clamp assembly.

By using the heat protection device via the clamp, the quantity of heat may remain in the system or be kept away from the system. Consequently, the heat protection device may act as a heat insulation in a bidirectional manner. In particular, an environment which is adjacent to the clamp can be protected from high or low temperatures of the clamp and damage or fire risk can be prevented.

Such a heat protection device may be produced integrally with a new clamp and be provided as an integral clamp assembly. Alternatively, or additionally, the heat protection device may be configured as a retrofit solution and may be able to be assembled on existing or assembled clamps. To this end, the housing of the heat protection device may be guided at the circumference around a mounted clamp and be fixed at the end to a closure portion of the heat protection device. The closure portion may be configured in an optional manner if the heat protection device can be secured to the clamp in a uniform manner at the circumference.

The shape and dimensions of the housing may in this instance be able to be adapted to different clamps and/or be configured to be adapted universally to a large number of clamps. For example, the heat protection device may have an adjustable length, whereby clamps of different sizes can be provided with the heat protection device.

With a single-piece configuration of the clamp assembly, the assembly complexity of the clamp and the heat protection device can be reduced. In particular, as a result of the heat protection device, existing clamps and connectors can also be retrofitted.

According to an embodiment, a heat protection device is configured in such a manner that it can be connected to the clamp in a materially engaging or positive-locking manner. For example, the heat protection device may have flanks which are positioned on the housing and which can be bent around the clamp. A positive-locking connection can thereby be produced between the clamp and the housing of the heat protection device. Furthermore, the housing of the heat protection device may at least partially have a shape which can form a locking connection with a portion of the clamp, such as, for example, the clamping band.

Alternatively, or additionally, the heat protection device may be able to be connected to the clamp by means of punching, clinching connection, frictional engagement, adhesives, adhesive strips and the like.

In particular, there may be provided on the walls of the heat protection device recesses in which laterally arranged locking projections of the clamp can be inserted in a positive-locking manner. The clamp can thereby be arranged parallel with the at least one insulation layer between the walls of the housing. In particular, the clamp or at least the clamping band of the clamp may extend parallel with the circumferential wall and the at least one insulation layer. The clamp can consequently at least partially terminate the open U-shape of the housing.

The housing may further have at least one recess which serves to receive the clamping device of the clamp. The clamp can thereby be mounted in spite of the arranged heat protection device.

The heat protection device can be connected to the clamp in a technically particularly simple manner if at least a portion of the housing is configured so as to be able to bend to produce a positive-locking connection to the clamp. To this end, at least one portion of the housing wall can be configured to be longer than the remaining portions of the walls. The extended portion may be able to be bent along a line, whereby a bendable retention tongue is constructed.

According to another embodiment, the heat protection device has a housing clamp which can be connected to the housing in order to connect the heat protection device to the clamp. The housing clamp may, for example, be a hose clamp or a heavy-duty clamp which have a clamping band, two clamping jaws which are arranged at the end on the clamping band and a clamping screw for adjusting a spacing between the clamping jaws of the housing clamp. The housing clamp may be secured to an outer side of the circumferential wall of the housing at least in regions.

The housing clamp can be used to arrange the heat protection device around a clamp and to lock in an optimum manner via the clamp.

The housing clamp may be able to be fitted to the circumferential wall of the housing in a particularly flexible manner when the housing clamp is connected to the housing by means of at least one welding location, locking connection, punching location and/or at least one clinching location.

According to another embodiment, the housing has at the radially outer side thereof at least one guiding portion for receiving and guiding a clamping band of the housing clamp. The housing clamp can thereby be connected to the housing in a positive-locking manner. In particular, the clamping band of the housing clamp can be guided by the guiding portions. The guiding portions may be configured as punched-out portions or flaps which radially protrude in regions from the circumferential wall of the housing and which form a guiding tunnel-like member for receiving the clamping band.

In the receiving space of the heat protection device, at least one additional insulating layer of air can be introduced when the heat protection device has at least one spacer element. The spacer element is, for example, configured as a flap, a bead and/or as a material insert. The at least one spacer element can thereby be configured to be flexible and to correspond to the respective application of the heat protection device. As a result of the introduction of an insulating layer of air, the thermal insulation of the heat protection device can be improved with minimum material complexity.

Such spacer elements may, for example, be arranged between the insulation layer and the clamp or between the insulation layer and the circumferential wall of the housing. Furthermore, both between the insulation layer and the clamp and between the clamp and the insulation layer, a layer of air can be adjusted by using spacer elements. The thickness of the layer of air can be flexibly adjusted in accordance with the extent of the spacer elements in a radial direction. The spacer elements which are used may have identical or different dimensions. In particular, by using spacer elements, the thermal insulation of the heat protection device in a circumferential direction can be configured in a variable manner. For example, one half of the heat protection device may have an additional layer of air. Specific regions can thereby be more effectively shielded against the effects of heat.

The at least one spacer element may be used in a radial direction and/or in an axial direction for adjusting layers of air within the clamp assembly. Consequently, a transmission of heat by the heat protection device can also be reduced in an axial direction.

According to another embodiment, the at least one spacer element can be fitted to the clamp and/or to the housing and/or to at least one insulation layer. Consequently, the at least one spacer element can be arranged in a varied manner within the clamp assembly. For example, spacer elements can already be introduced during the production of the clamp or the housing in the form of punched-out portions or bending flaps.

According to another embodiment, as a result of the at least one spacer element, at least one air gap can be formed in a radial direction between the clamp and at least one insulation layer, between the at least one insulation layer and an inner side of the housing, between two insulation layers and/or in an axial direction between the clamp and the walls of the housing, between the at least one insulation layer and the walls of the housing and/or between two insulation layers. The at least one spacer element can thereby be used in a flexible manner depending on the requirements in order to influence the thermal properties of the heat protection device. The thickness of the clamp assembly can consequently also be adjusted or controlled in a selective manner.

The heat protection device can be assembled on a clamp in a particularly form-fitting manner and rapidly when the heat protection device has at least one protuberance for receiving the clamping device of the clamp. The clamp may in this instance be any clamp. For example, the clamp may be configured as a profile clamp, pipe clamp, hose clamp, securing clamp and the like.

According to another embodiment, the heat protection device has at least one overlapping portion which is arranged on the housing at the end. According to an embodiment, the overlapping portion is configured, in the assembled state of the clamp assembly, to cover and/or to touch the second end portion of the housing. In the closed state of the clamp assembly, a pipe or component which is engaged round by the clamp assembly can thereby be completely covered by the heat protection device. In particular, a complete circumferential heat protection action can be achieved as a result of the overlapping portion.

Preferably, per an embodiment, the overlapping portion may be configured integrally with the housing. Alternatively, the overlapping portion may be able to be secured to the housing and/or to the clamping band. The overlapping portion may overlap the second end portion of the housing, for example, laterally or internally and consequently ensure heat protection without interruption.

BRIEF DESCRIPTION OF THE FIGURES

Other features, details and advantages of the invention will be appreciated from the wording of the claims and from the following description of embodiments with reference to the drawings, in which:

DETAILED DESCRIPTION

Figure 1:
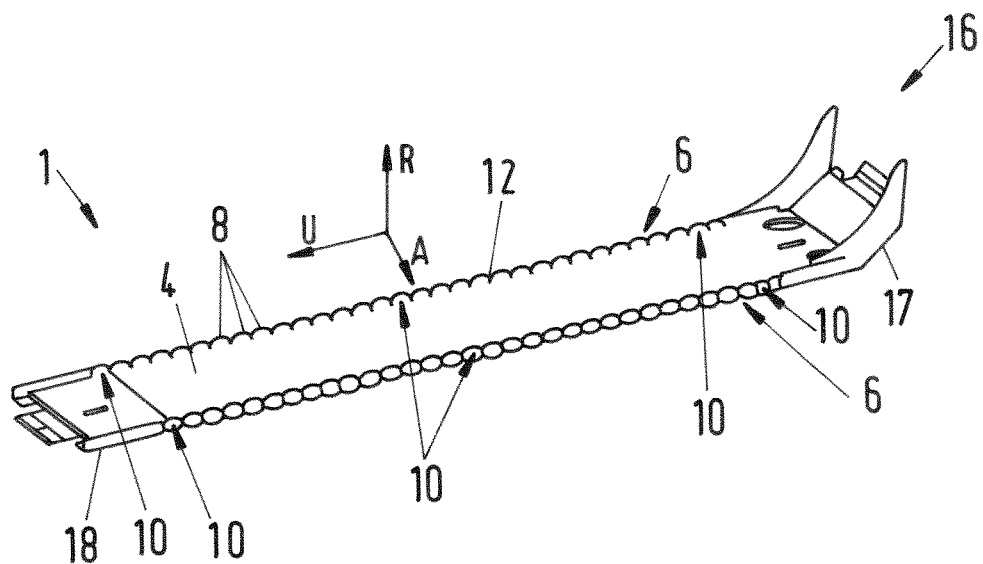
FIG. 1 is a perspective illustration of a housing of a heat protection device according to an embodiment.

FIG. 1 is a perspective illustration of a housing 1 of a heat protection device 2 according to an embodiment. The housing 1 has a circumferential wall 4 which extends in a circumferential direction U. At both sides of the circumferential wall 4, a wall or side wall 6 of the housing 1 is configured as an extension of the circumferential wall 4 in an axial direction A. The walls 6 are bent over with respect to the circumferential wall 4 in a radial direction R and form according to the embodiment a right angle with respect to the circumferential wall 4.

The walls 6 of the housing 1 are subdivided into portions 8, 10 which may be spaced apart from each other by means of recesses 12. The recesses 12 or the portions 8, 10 are formed in this instance in such a manner that the housing 1 can be positioned at the circumference around a clamp 14. In particular, the portions 8, 10 may have a tapered form as the spacing from the circumferential wall 4 increases, whereby the housing 1 can conform to a substantially round clamp 14 at the circumference.

One or more portions 10 of the wall 6 may be configured to be longer in order to produce a connection to the clamp 14 by means of the extended portions 10 being bent over at the end.

The housing 1 has a closure portion 16 which is formed by means of a positive-locking cooperation of end portions 17, 18. The closure portion 16 may be able to be adapted to a form of the clamp 14. In particular, a length of the housing 1 can be adjusted by means of the closure portion 16.

Figure 2:
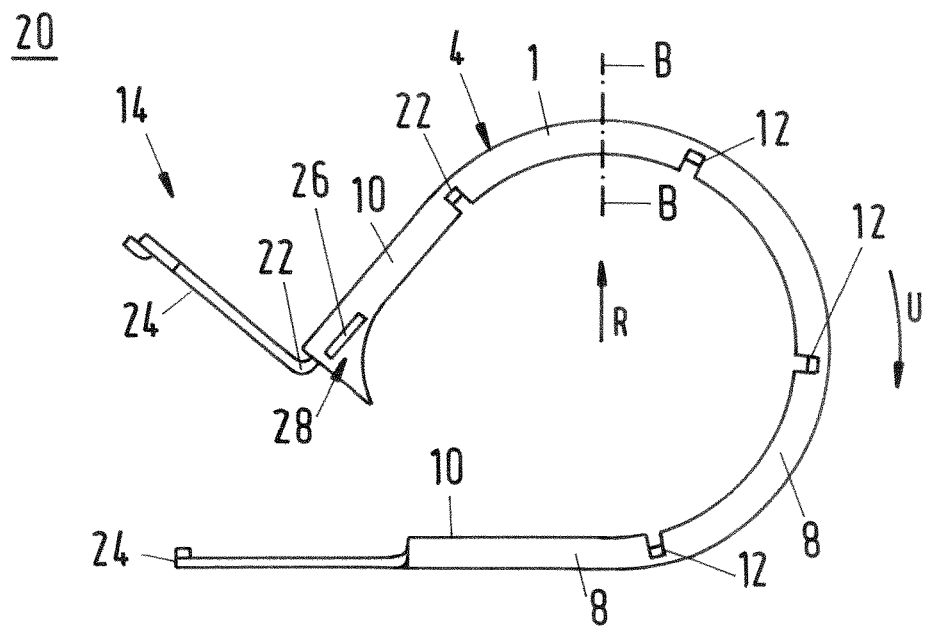
FIG. 2 is a side view of a clamp assembly according to an embodiment.

FIG. 2 is a side view of a clamp assembly 20 according to an embodiment. The clamp assembly 20 has a clamp 14 having a clamping band 22 and having a clamping device 24 for clamping the clamping band 22. The clamping device 24 is illustrated schematically in this instance and is configured as a snap-fit closure which is arranged at the end on the clamping band 22.

According to the embodiment, the housing 1 has locking grooves 26 which are introduced into the walls 6. The clamping band 22 has locking projections 28 which correspond to the respective locking groove 26 and which can be inserted in the locking grooves 26. The clamp 14 can thereby be locked in a fixed manner on the housing 1.

The folded over extended portions 10 of the walls 6 are illustrated by the side view. In this instance, the extended portions 10 have in the bent state the same length as the remaining portions 8 of the wall 6.

For the sake of clarity, a receiving space having at least one insulation layer in FIG. 2 is not illustrated. A detailed explanation relating to this is set out in FIGS. 10 to 18 which show a section B-B of FIG. 2.

Figure 3:
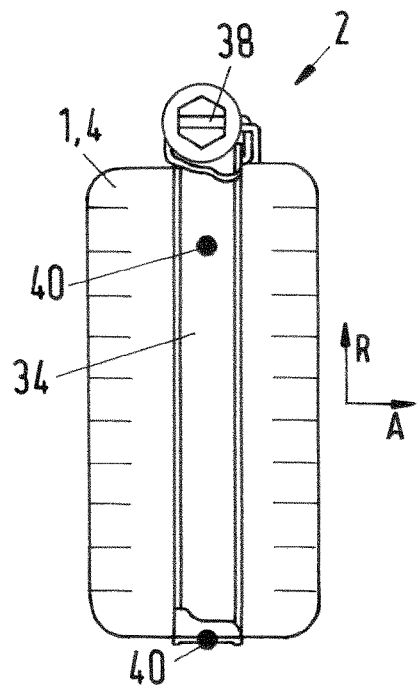
FIG. 3 is a plan view of a heat protection device according to an embodiment.
Figure 4:
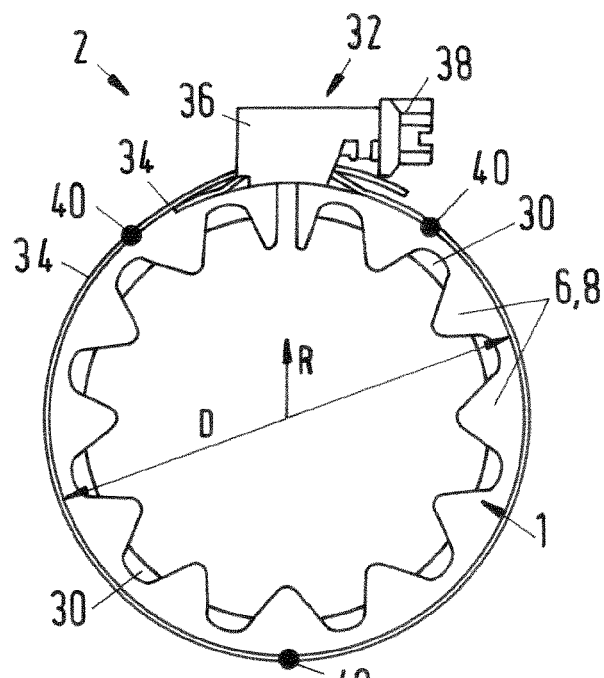
FIG. 4 is a side view of the heat protection device from FIG. 3.

FIG. 3 is a plan view of a heat protection device 2 according to an embodiment. A corresponding side view is illustrated in FIG. 4. The heat protection device 2 has a housing 1 and an insulation layer 30 which is arranged in the housing 1.

According to the illustrated embodiment, the heat protection device 2 has a housing clamp 32 which can be connected to the housing 1 for connecting the heat protection device 2 to the clamp 14.

The housing clamp 32 is configured by way of example as a hose clamp. The housing clamp 32 has a clamping band 34 and a clamping device 36 having a clamping screw 38 which cooperates with a thread which is stamped in the clamping band 34. As a result of the activation of the clamping device 36, a diameter D of the heat protection device 2 can be adjusted to clamps 14 of different sizes.

The housing clamp 32 is connected via three connection locations 40 which are stamped as welding locations to the circumferential wall 4 of the housing 1. The connection locations 40 may also be formed as clinching locations, adhesive locations, punching locations and the like.

Figure 5:
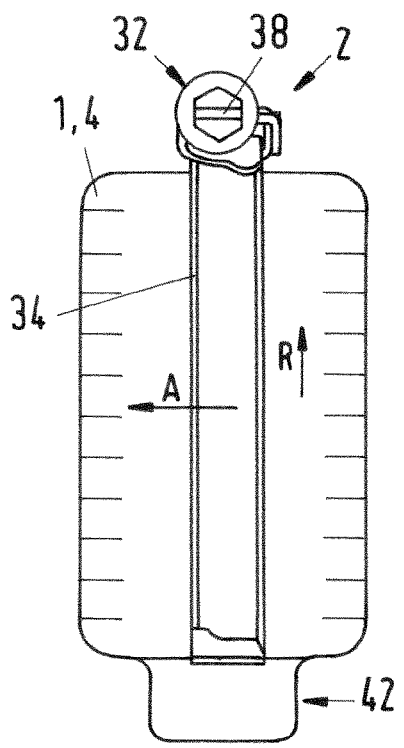
FIG. 5 is a plan view of a heat protection device according to another embodiment.
Figure 6:
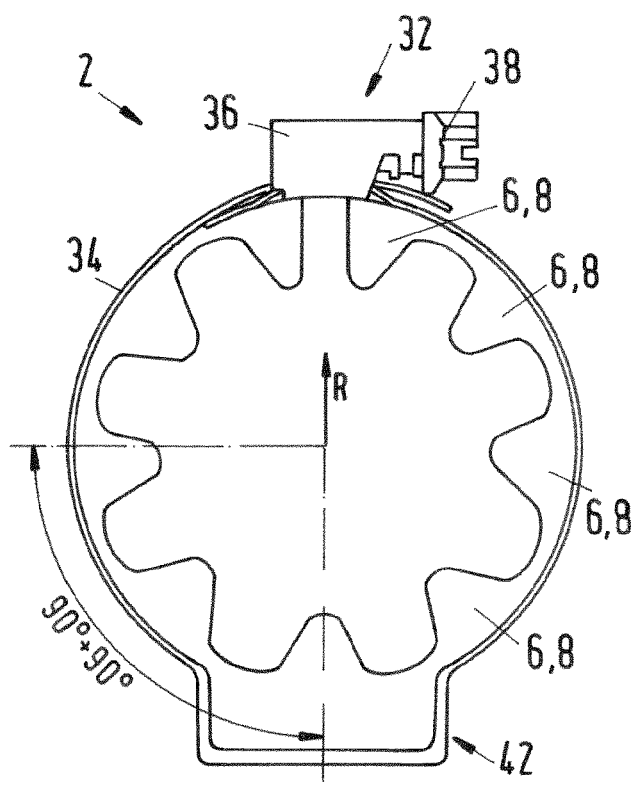
FIG. 6 is a side view of the heat protection device from FIG. 5.

FIG. 5 is a plan view of a heat protection device 2 according to another embodiment. The corresponding side view of the heat protection device 2 is illustrated in FIG. 6. The connection locations 40 and the insulation layer 30 are in this instance not illustrated for the sake of clarity. In contrast to the embodiments already shown, the heat protection device 2 has in this instance a protuberance 42 for receiving the clamping device 24 of the clamp 14.

The protuberance 42 is rotated through 180° with respect to the clamping device 36 of the housing clamp 32 so that the clamping device 24 of the clamp 14 which is insulated by the heat protection device 2 is not impaired.

Figure 7:
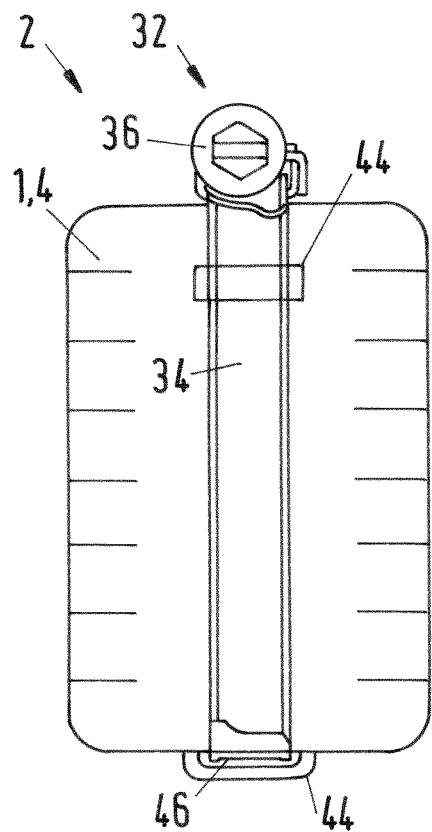
FIG. 7 is a plan view of a heat protection device according to another embodiment.
Figure 8:
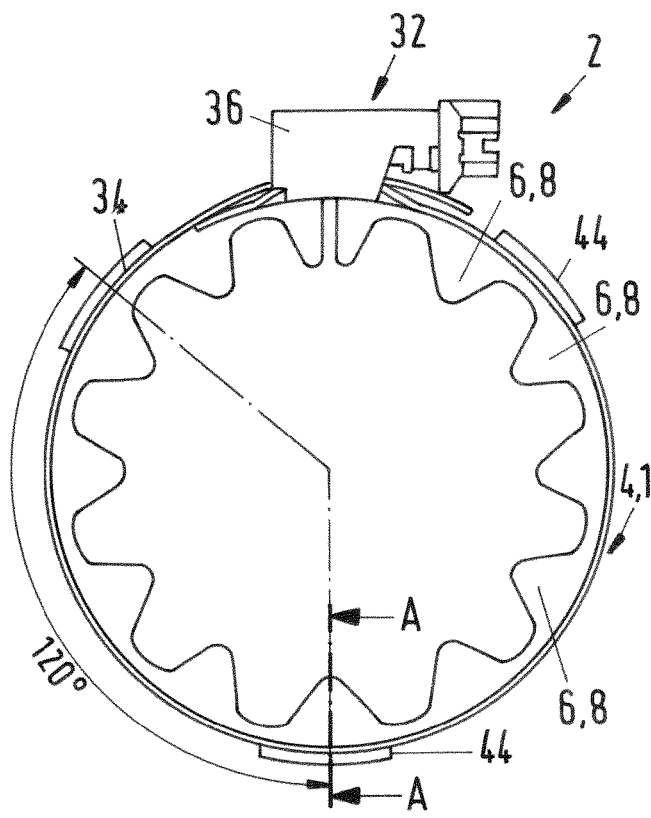
FIG. 8 is a side view of the heat protection device from FIG. 7.
Figure 9:
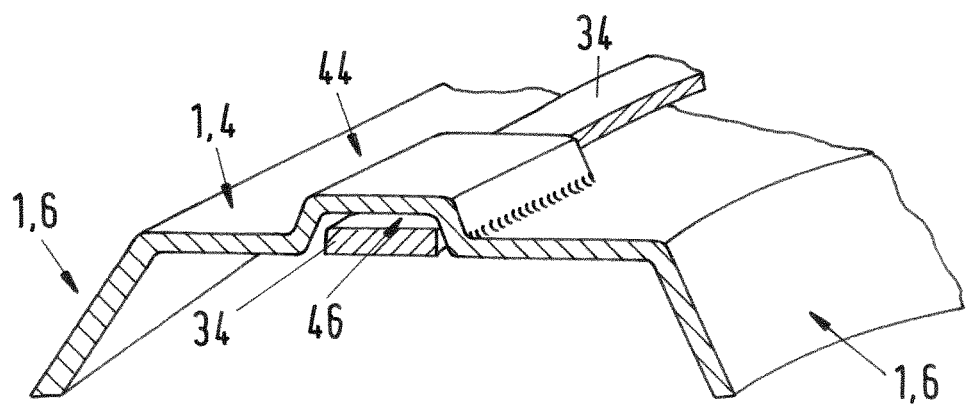
FIG. 9 is a cross section A-A from FIG. 8 to illustrate a guiding portion.

FIG. 7 and FIG. 8 show a heat protection device 1 according to another embodiment from different perspectives. In contrast to the embodiments already shown, the housing clamp 32 is arranged on the housing 1 by means of guiding portions 44. FIG. 9 shows in this regard a cross section A-A which illustrates the stamping of the guiding portions 44.

The housing 1 at the radially outer side or circumferential side 4 thereof three guiding portions 44 for receiving and guiding the clamping band 34 of the housing clamp 32. The housing clamp 32 can thereby be connected in a positive-locking manner to the housing 1. In particular, the clamping band 34 of the housing clamp 32 can be guided by the guiding portions. The guiding portions 44 may be configured as punched portions or flaps which protrude radially from the circumferential wall 4 of the housing 1 in regions and which form a guiding tunnel-like member 46 for receiving the clamping band 34.

FIGS. 10 to 18 are schematic cross sections B-B from FIG. 2 in order to illustrate the possible embodiments of a heat protection device 2. In particular, a receiving space 48 of the heat protection device 2 is illustrated. The receiving space 48 is formed by the side walls 6 of the housing 1 and the circumferential wall 4. The receiving space 48 has a U-shaped profile in this instance.

Figure 10:
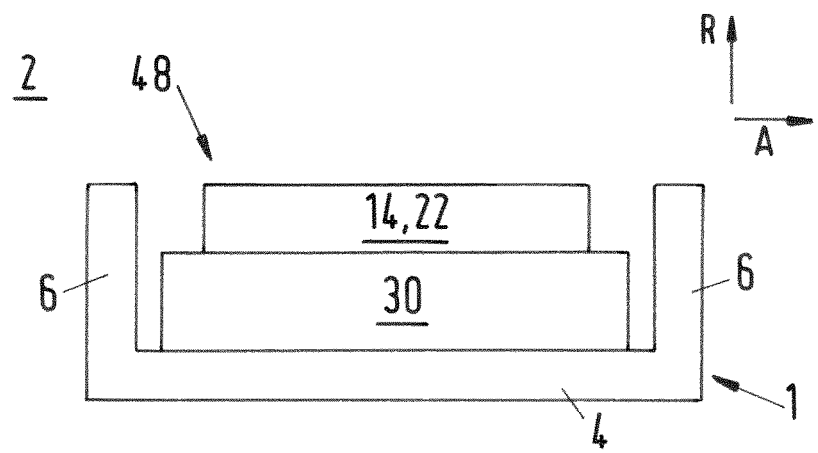
FIGS. 10-18 are cross sections B-B from FIG. 2 to illustrate the possible embodiments of a heat protection device.

In a first embodiment which is shown in FIG. 10, the receiving space 48 is filled with an insulation layer 30. The receiving space 48 is closed by the clamping band 22 of the clamp 14.

Figure 11:
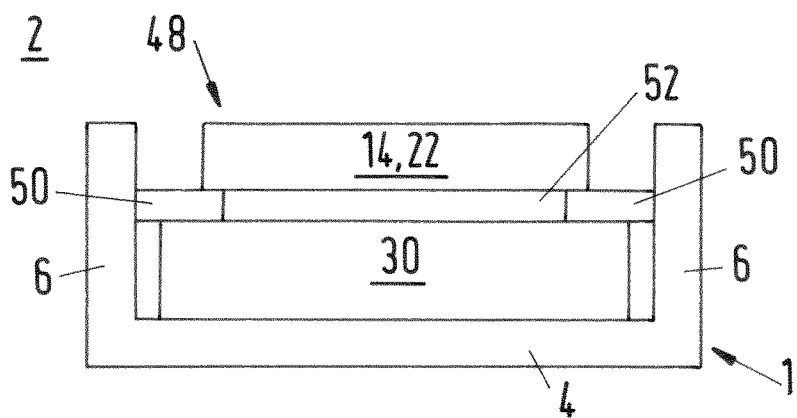

FIG. 11 illustrates an example in which an additional insulating layer of air 52 is introduced. To this end, the heat protection device 2 has at least two spacer elements 50. According to the embodiment, the spacer elements 50 are arranged between the clamp 14 and the insulation layer 30. The spacer elements 50 are introduced laterally onto the walls 6 of the housing 1 at the receiving space side.

Figure 12:
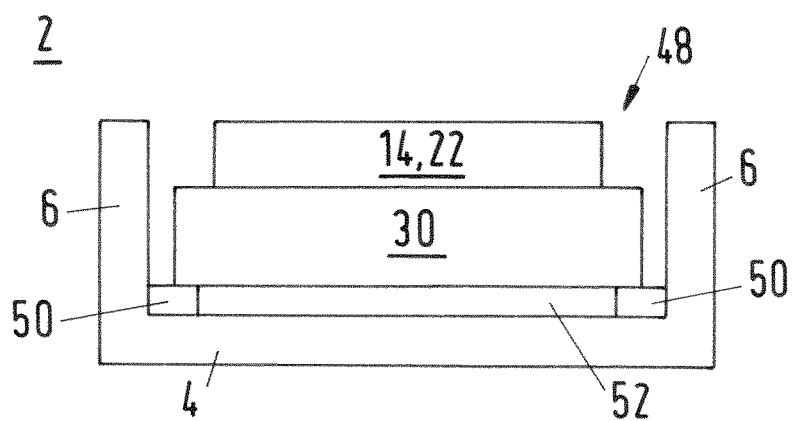
Figure 13:
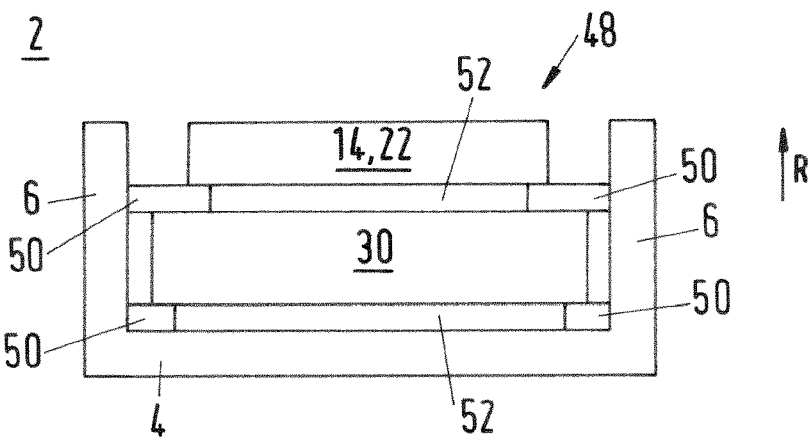

In FIG. 12, an insulating layer of air 52 is produced between the circumferential wall 4 and the insulation layer 30 by means of correspondingly arranged spacer elements 50. In FIG. 13, two insulating layers of air 52 are produced in a radial direction R between the clamp 14 and the insulation layer 30 and between the insulation layer 30 and the housing 1 by means of spacer elements 50.

Figure 14:
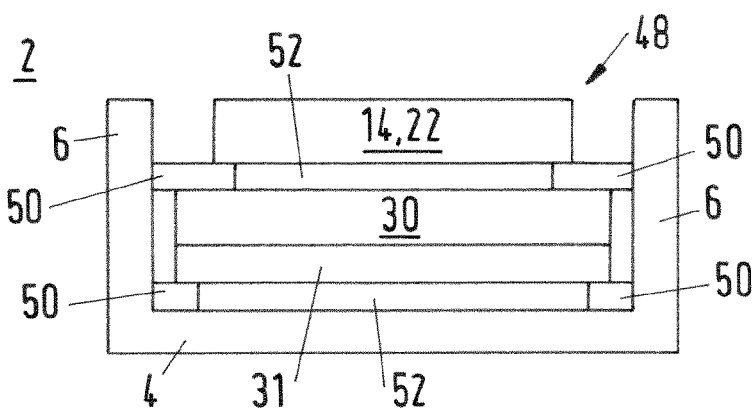
Figure 15:
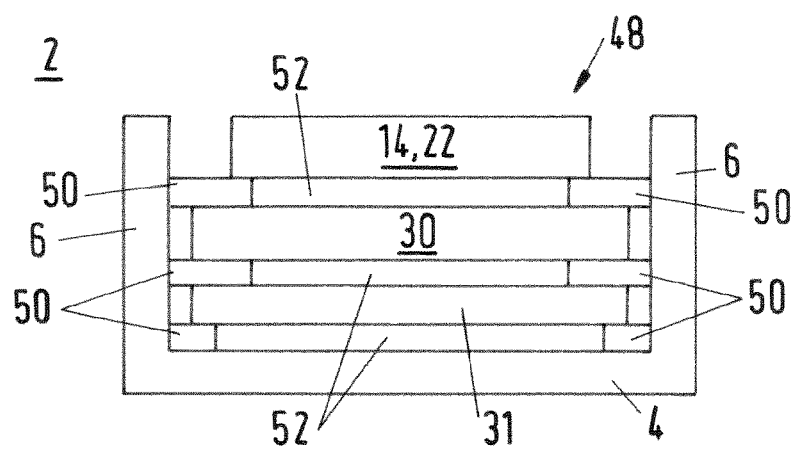

FIGS. 14 and 15 show heat protection devices 2 which have two different insulation layers 30, 31. The first insulation layer 30 may in this instance have a different material from the second insulation layer 31. The insulation layers 30, 31 may be connected to each other or separated from each other by means of a layer of air 52.

Figure 16:
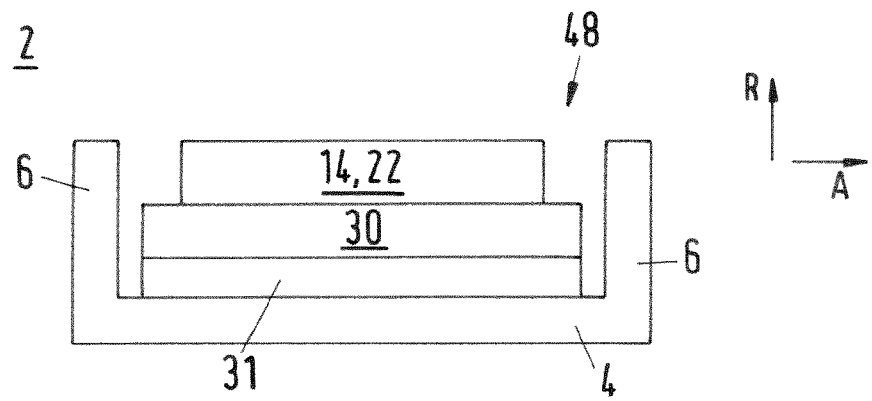

FIG. 16 shows an embodiment of the heat protection device 2 which corresponds to FIG. 10, wherein in this instance two insulation layers 30, 31 which are directly connected to each other and the clamp 14 are inserted. For example, the insulation layers 30, 31 may be adhesively bonded to the housing 1 and the clamp 14.

Figure 17:
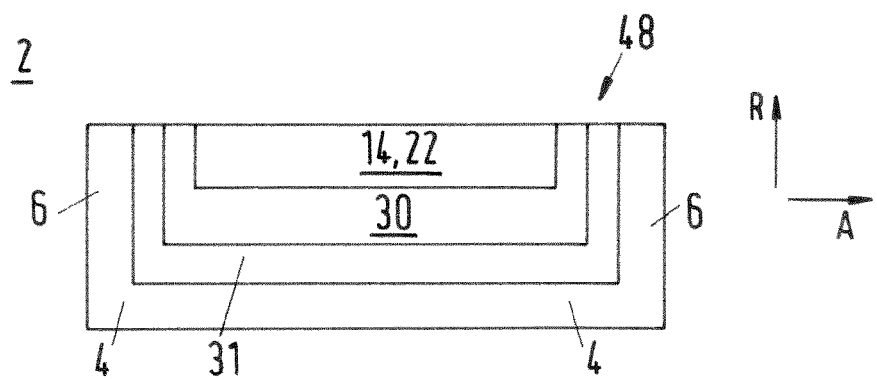
Figure 18:
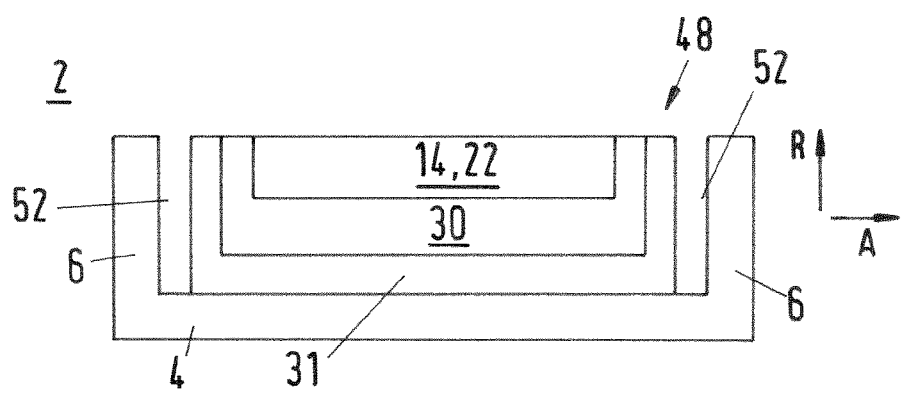

In FIGS. 17 and 18, the insulation layers 30, 31 not only have a planar extent in an axial direction A, but instead also engage around the clamp 14 in a radial direction R in regions. The insulation layers 30, 31 thereby also form in a similar manner to the receiving space 48 a U-shape. A heat transfer in an axial direction A from the clamp 14 and to the clamp 14 can thereby be prevented or at least attenuated.

FIG. 18 shows an example in which an air gap may also be formed in an axial direction A between the insulation layers 30, 31 or between an insulation layer 31 and the walls 6 of the housing 1.

The invention is not limited to one of the above-described embodiments but can instead be modified in many ways.

All of the features and advantages derived from the claims, the description and the drawings, including structural details, spatial arrangements and method steps, may be significant to the invention both individually and in extremely different combinations.

Figure 19:
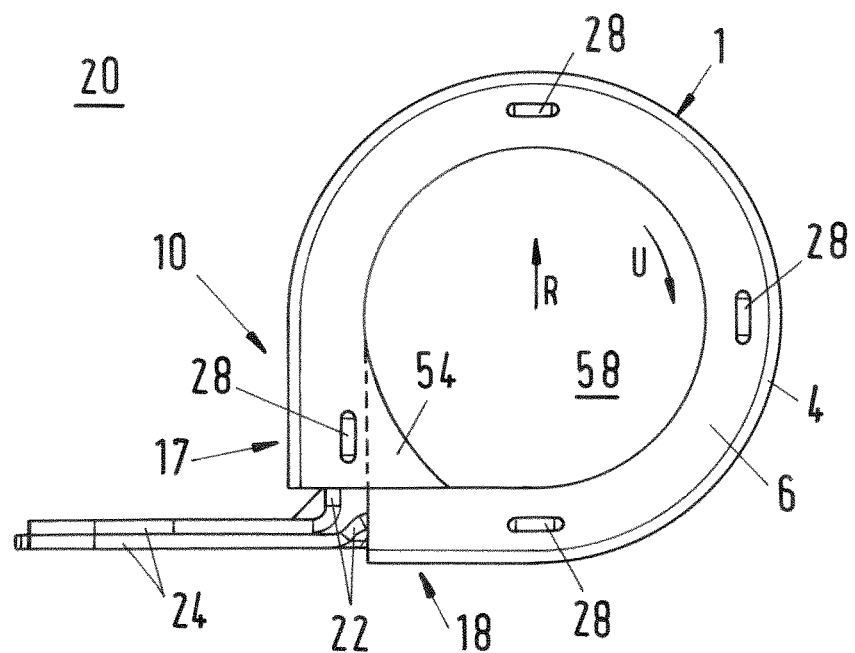
FIG. 19 is a side view of a clamp assembly having an overlapping portion according to an embodiment.

FIG. 19 is a side view of a clamp assembly 20 having an overlapping portion 54 according to an embodiment. The overlapping portion 54 is arranged at a first circumferential end 17 of the housing 1 of the heat protection device 2 and extends in a radial direction R into a receiving portion 58 of the clamp assembly 20. In the receiving portion 58, for example, a component, a pipe, a hose and the like, can be received or secured.

The overlapping portion 54 is shaped in a rounded manner according to the clamp assembly 20 and preferably follows the shape of the receiving portion 58. Consequently, a continuous support face of the heat protection device 2 can be provided in the receiving portion 58.

In particular, the clamp assembly 20 is illustrated in an assembled state, in which the overlapping portion 54 contacts the second end portion 18 of the housing 1 at one side and consequently prevents interruptions in the heat protection device 2. The second end portion 18 of the housing 1 forms in this instance in the circumferential direction U a second end of the housing 1 of the heat protection device 2.

Figure 20:
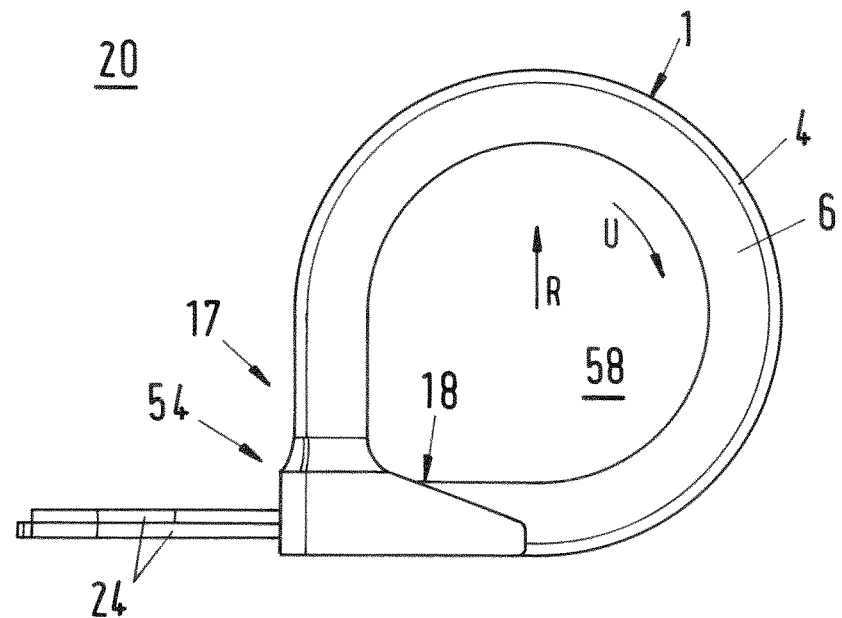
FIG. 20 is a side view of a clamp assembly having an overlapping portion according to another embodiment.

FIG. 20 is a side view of a clamp assembly 20 having an overlapping portion 54 according to another embodiment. In contrast to the embodiment illustrated in FIG. 19, the overlapping portion 54 is formed in this instance in such a manner that in an axial direction A it overlaps the second end portion 18 of the housing 1 at least axially at one side.

In the embodiment illustrated, the overlapping portion 54 extends the first end 55 of the housing 1 in a circumferential direction U.

The overlapping portion 54 may overlap the second end portion 18 of the housing 1 axially at both sides or at least partially engage around the second end portion 18 of the housing 1. It is thereby also possible, for example, to prevent the heat protection device 2 from sliding in the connection region between the first end portion 17 and the second end portion 18.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS

1 Housing
2 Heat protection device
4 Circumferential wall
6 Wall/side wall
8 Portion
10 Extended portion
12 Recess
14 Clamp
16 Closure portion
17 First end portion of the housing
18 Second end portion of the housing
20 Clamp assembly
22 Clamping band
24 Clamping device
26 Locking groove of the housing
28 Locking projection of the clamp
30 Insulation layer/first insulation layer
31 Second insulation layer
32 Housing clamp
34 Clamping band of the housing clamp
36 Clamping device of the housing clamp
38 Clamping screw of the housing clamp
40 Welding location/connection location
42 Protuberance
44 Guiding portion
46 Guiding tunnel-like member
48 Receiving space
50 Spacer element
52 Layer of air
54 Overlapping portion
58 Receiving portion
A Axial direction
D Diameter of the heat protection device
R Radial direction
U Circumferential direction

The invention claimed is:

1. A clamp assembly having a clamp comprising a clamping band and comprising a clamping device for clamping the clamping band, and comprising a heat protection device having a housing and having at least one insulation layer, the housing having a wall at the axial end faces thereof, the wall being subdivided into portions and protruding radially inward, the at least one insulation layer being arrangeable between the walls of the housing, wherein the clamp is embraceable at least in regions by the housing and/or the at least one insulation layer of the heat protection device, the heat protection device being connected to the clamp, in a positive-locking manner, at least one portion of the housing wall being configured to be able to be bent in order to produce a positive-locking connection to the clamp, wherein the at least one portion of the housing wall is configured to be longer than the remaining portions of the walls, the at least one portion of the housing wall being bendable along a line, to provide a bendable retention tongue, wherein the housing has a circumferential wall and the walls of the housing protrude from the circumferential wall in a radial direction, and wherein an insulating layer of air is produced between the circumferential wall and the at least one insulation layer by means of at least one correspondingly laterally arranged spacer element.

2. The clamp assembly as claimed in claim 1, wherein the heat protection device has a housing clamp which can be connected to the housing in order to connect the heat protection device to the clamp.

3. The clamp assembly as claimed in claim 2, wherein the housing clamp is connected to the housing by at least one welding location, locking connection, punching location or at least one clinching location.

4. The clamp assembly as claimed in claim 1, wherein the housing has at a radially outer side thereof at least one guiding portion for receiving and guiding a clamping band of the housing clamp.

5. The clamp assembly as claimed in claim 1, wherein the spacer element is configured as a flap, a bead or as a material insert.

6. The clamp assembly as claimed in claim 5, wherein the at least one spacer element can be fitted to the clamp or to the housing or to at least one insulation layer.

7. The clamp assembly as claimed in claim 5, wherein, as a result of the at least one spacer element, at least one air gap can be formed in a radial direction (R) between the clamp and at least one insulation layer, between the at least one insulation layer and an inner side of the housing, between two insulation layers or in an axial direction (A) between the clamp and the walls of the housing, between the at least one insulation layer and the walls of the housing or between the two insulation layers.

8. The clamp assembly as claimed in claim 1, wherein the heat protection device has at least one protuberance for receiving the clamping device of the clamp.

9. The clamp assembly as claimed in claim 1, wherein the heat protection device has at least one overlapping portion which is arranged on the housing at the end, wherein the overlapping portion is configured, in the assembled state of the clamp assembly, to cover or to touch a second end portion of the housing.

10. A clamp heat protection device for surrounding a clamp at least in regions, having a housing which extends at the circumference and which has two walls which are formed so as to protrude in a radial direction (R) relative to an axis (A), and having at least one insulation layer which can be inserted into the housing, wherein the at least one insulation layer can be inserted directly or via at least one spacer element into the housing, wherein one of the two walls is configured to be longer than the remaining portions of the walls, the at least one portion of the housing wall being bendable along a line, to provide a bendable retention tongue, and the housing further includes a circumferential wall, wherein an insulating layer of air is produced between the circumferential wall and the at least one insulation layer by means of at least one correspondingly laterally arranged spacer element.

* * * * *